US006864496B2

(12) United States Patent
Levine

(10) Patent No.: US 6,864,496 B2
(45) Date of Patent: Mar. 8, 2005

(54) LIGHTING EFFECT GENERATOR

(76) Inventor: Chris Levine, 70 Alexandra Rd, Kew Surrey (GB), TW9 2B5

(*) Notice: Subject to any disclaimer, the term of this patent is extended or adjusted under 35 U.S.C. 154(b) by 42 days.

(21) Appl. No.: 10/136,081

(22) Filed: May 1, 2002

(65) Prior Publication Data

US 2003/0206415 A1 Nov. 6, 2003

(51) Int. Cl.[7] ............................ G21G 4/00; G02B 5/32; G09G 3/00

(52) U.S. Cl. ........................ 250/493.1; 345/32; 359/15; 362/29; 362/553

(58) Field of Search ......................... 250/493.1; 359/15, 359/27; 362/29, 553

(56) References Cited

U.S. PATENT DOCUMENTS

| | | | | |
|---|---|---|---|---|
| 3,634,679 A | | 1/1972 | Krzyston et al. | 240/10.1 |
| 3,822,930 A | | 7/1974 | Douklias | 350/162 |
| 6,396,463 B1 | * | 5/2002 | Tomono | 345/8 |
| 6,491,420 B1 | * | 12/2002 | Scifres | 362/553 |
| 6,508,563 B2 | * | 1/2003 | Parker et al. | 362/29 |
| 6,542,134 B1 | * | 4/2003 | Raj | 345/32 |

FOREIGN PATENT DOCUMENTS

| | | |
|---|---|---|
| DE | 29917552 | 12/1999 |
| FR | 2089373 | 1/1972 |
| GB | 1338516 | 11/1973 |

* cited by examiner

*Primary Examiner*—John R. Lee
*Assistant Examiner*—Paul M. Gurzo
(74) *Attorney, Agent, or Firm*—Andrus, Sceales, Starke & Sawall, LLP

(57) ABSTRACT

A device for generating lighting effects, the device comprises a light modulating component which is formed from an optically transmissive material and has a multi-faceted surface and also a means for rotating the light modulator in use. The device further comprises a light source, which is positioned such that the light passes through the light modulating component to illuminate a light receiving surface. This, in turn, produces an optical illumination effect.

13 Claims, 2 Drawing Sheets

LIGHTING EFFECT GENERATOR

BACKGROUND OF THE INVENTION

This invention relates to a device for generating lighting effects.

Many differing types of lighting effects generating devices are available. These vary from well known "lava lamp" type devices to more complex projection systems.

There is a constant demand from consumers for lighting effect devices which are inexpensive yet which produce novel and appealing lighting effects. Furthermore, there is also a desire amongst consumers to be able to modify the effects produced by the device without going to the expense of buying a complete replacement device.

SUMMARY OF THE INVENTION

According to the present invention there is provided a device for generating lighting effects, the device comprising:

a light modulating component formed from an optically transmissive material and having a diffractive construction;

a light source; and means for generating relative motion between the light modulating component and the light source in use;

the light source being positioned such that, in use, light therefrom passes through the light modulating component to thereby illuminate a light receiving surface to produce an optical illumination effect.

The light source may be multiple light sources.

The light source may include at least one of the following group: gas discharge laser, diode laser and coloured LED.

The light modulating component may be multi-faceted crystal and my be formed from glass, lead crystal or polycarbonate. In such a case the surface of the light modulating component may comprise planar facets.

The axis of rotation of the light modulator may be offset from the light transmission axis of the light source.

A second light modulating component may be provided for modulating the light either before or after it passed through the first light modulating component. This second light modulating component may be a diffraction grating, or may be a textured glass or acrylic, or could include both.

Additional optical components may be provided with the device so that it projects the lighting effect onto a wall in use, or such that it incorporates a light receiving surface as part of the device in such a case the light receiving surface may form part of the outer housing of the device.

If an outer housing is provided it may be at least partially translucent to customise the external projection of the lighting effects.

If a second optical modulating component is provided then it may be removable so that it can be replaced by a user to produce different effects.

BRIEF DESCRIPTION OF THE DRAWINGS

One example of the present invention will now be described with reference to the accompanying drawings, in which.

DETAILED DESCRIPTION OF THE INVENTION

Figure 1:
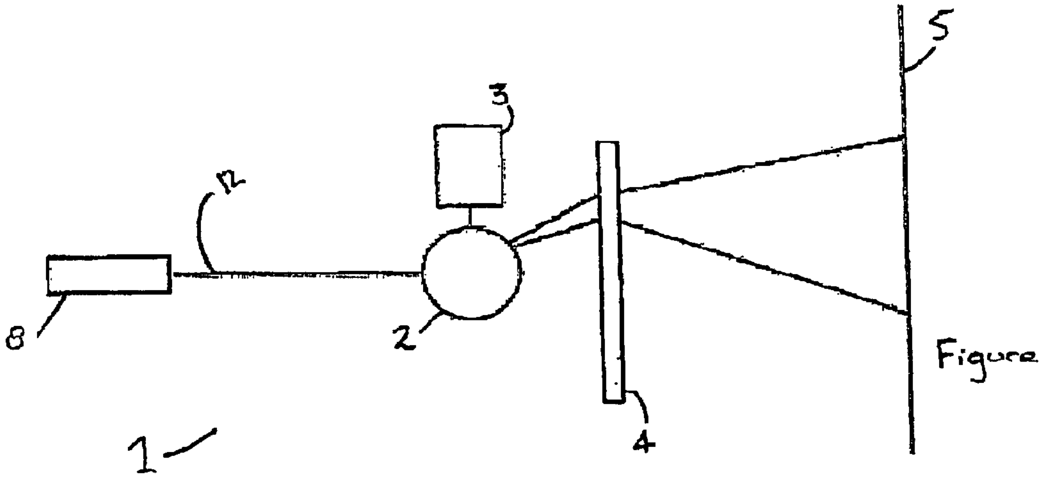
FIG. 1 is a schematic diagram showing components of an example of the invention and the operation thereof.

FIG. 1 shows an example 1 of the invention in which a light source 8, in this case a laser diode, generates a light beam 12 which is incident upon a light modulating component 2, in this case the light modulating component is a crystal. A motor 3 and support structure (10 in FIG. 3) is provided to rotate the crystal 2 about an axis. This axis is, in this example, offset from that of the light transmission axis of the light source. In this way the range over which the optical effects can be seen is increased. FIG. 1 indicates a single light source 8, in use, multiple light sources may be used (see FIG. 3). Once the light beam 12 has passed through the crystal 2 it is projected to a light receiving surface 5. En route it passes, in this example, through an additional light modulating component 4.

Figure 2:
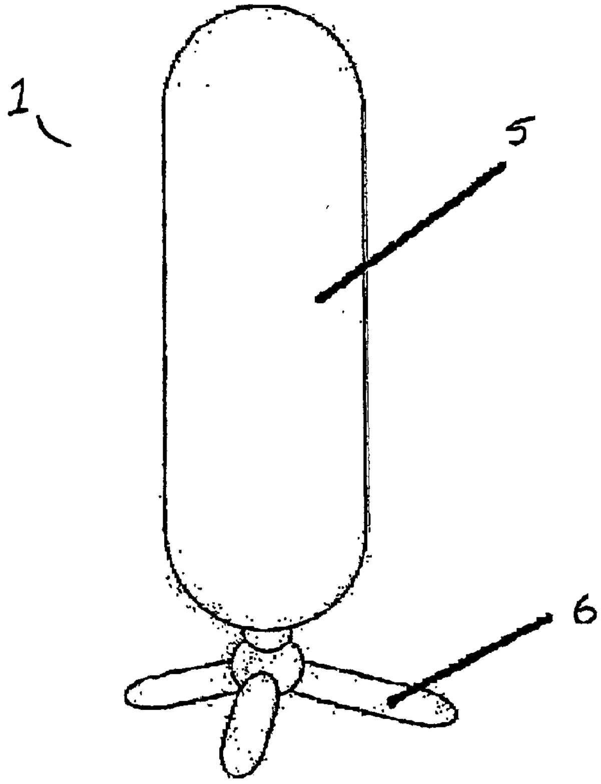
FIG. 2 is a schematic view of a device according to the invention.
Figure 3:
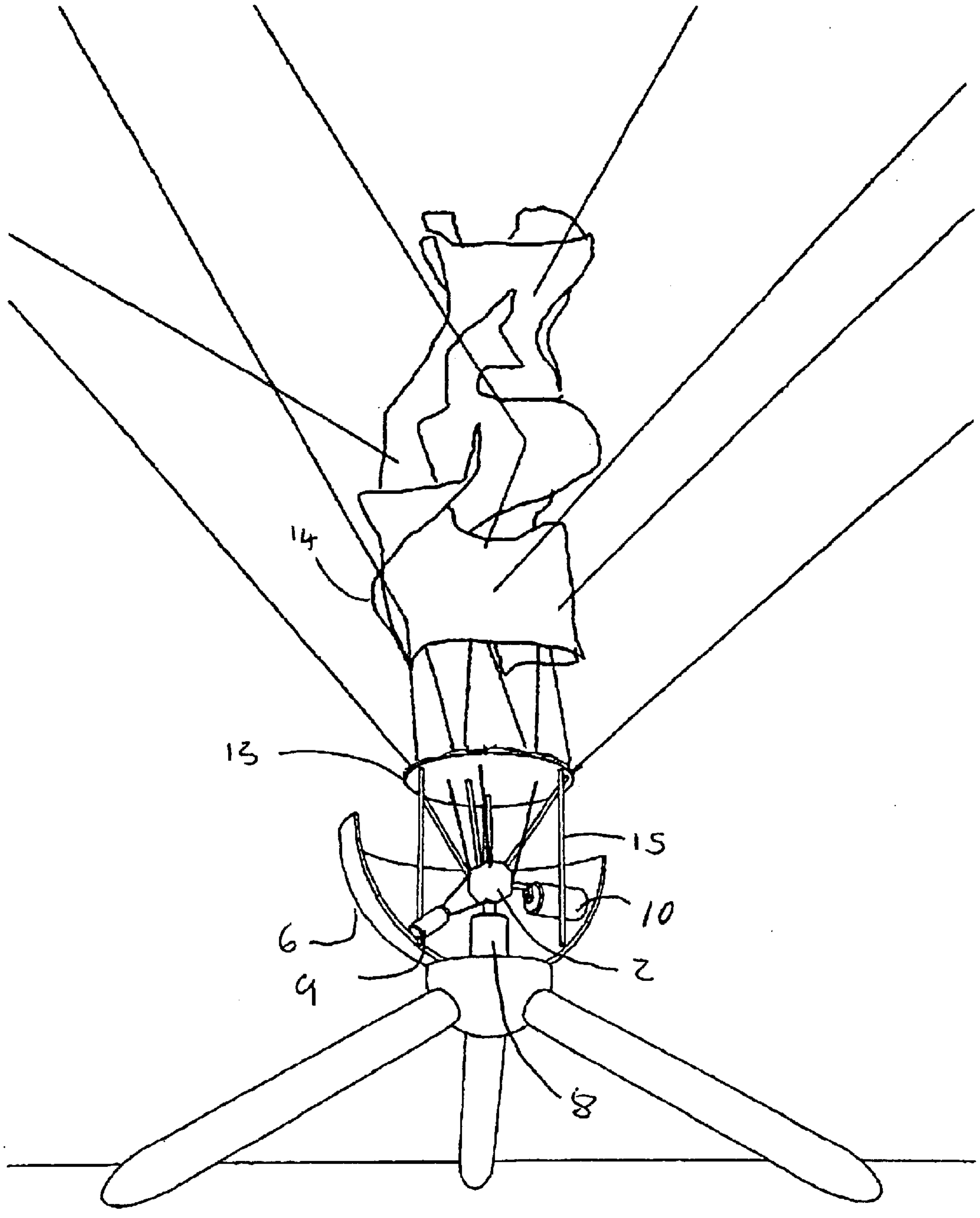
FIG. 3 is an isometric view of a device according to the invention with the outer housing removed for clarity.

FIGS. 2 and 3 illustrate a particular example of the invention which incorporates a tubular outer housing 5, which acts as the light receiving surface 5 discussed above, with hemispheres located at either end. The construction of the housing will be discussed in more detail below. A three legged base unit 6 incorporated light sources 8 and the mechanism 10 for supporting and motor for rotating 3 a light modulator 2, which is, in this case, a crystal 2 having multiple planar facets. Light from the light sources a passes through the crystal 2 and is diffracted in a multitude of directions to create an aesthetically pleasing effect. As discussed above, this light may also be passed through a sequence of additional modulating components 4 before being projected onto the housing 5 of the device 1 or, if there is no housing 5, onto a screen or a room wall (not shown).

The light sources will generally be commercially available laser diodes 8, however, since this would severely restrict the colours that could be used, additional, if weaker, light sources 9 of differing colours may be utilized to enhance the lighting effects. A typical alternative/additional source, which need not prohibitively increase the cost of the device, would be coloured LEDs 9. These may be used in conjunction with the lasers 8 to generate multicoloured effects.

Suitable optically transmissive materials for the composition of the crystal 2 include glass, lead crystal and polycarbonate. The modulating component 2 may be formed from an amorphous lump of light transmissive material, but is preferably formed with an outside surface comprising planar facets. The use of planar facets maintains the focussed projected aspects of light rather than the more diffuse light effects that would be generated by an smooth surfaced modulating component. The surface facets need not be regular, indeed a more random, and potentially more pleasing, effect will be produced if they differ in size.

The effects can be further customized, by an end user, by introducing a second light modulating component 4. This component may be represented by optical discs 13 made from textured material into the path of the light before or after the crystal 2. These discs 13 may be supported above the crystal 2 by a structure 15 attached to the base unit 6. The housing 5 further provides a structure to contain a selection of crumpled film 14, which may be holographic to act as a alternative second light modulating component 4, to modify the paths of light and further enhance the effects seen in the localized unit 1.

The device can be transformed from a localized light display unit 1 into a projection unit for a room by the removal of the translucent housing unit 5. The translucence provides a light receiving surface 5 for the projection such that the consumer can appreciate the localised effects of the lighting. The shape of this housing 5 may be altered (e.g. to that of a cube, a sphere or a pyramid) such that an alternative effect can be seen. The housing 5 may be removed altogether such that the light effects are projected onto the walls and ceiling of the surrounding room, or onto a screen such that a wider audience may appreciate the effects. A combination of these embodiments can be provided in a further embodiment where a housing is provided but the translucence does not extend over the entire surface of the housing, sections remain transparent. If a region (for example the region furthest from the light source) is clear and transparent then this will not act as a receiving surface and the lighting effects will pass through unhindered to be projected onto a neighbouring surface (for example a ceiling).

What is claimed is:

1. A device for generating lighting effects, the device comprising:

a light modulating component (2) formed from an optically transmissive material and having a diffractive construction;

a light source (8), said light source (8) comprises more than one light source and said more than one light source comprising at least one diode laser generating a light beam along a first light transmission axis and at least one colored LED generating a light beam along a second light transmission axis, said first light transmission axis being angularly offset with respect to said second light transmission axis; and means (3) for generating relative motion between the light modulating component (2) and the light source (8) in use;

the light source being positioned such that, in use, light therefrom passes through the light modulating component (2) to thereby illuminate a light receiving surface (5) to produce an optical illumination effect.

2. A device according to claim 1, wherein the light source further includes at least one gas discharge laser.

3. A device according to claim 1, wherein the light modulating component is holographic.

4. A device according to claim 1, wherein the light modulating component is a multi-faceted crystal.

5. A device according to claim 4, wherein the light modulating component (2) is formed from glass, lead crystal or polycarbonate.

6. A device according to claim 1, wherein the surface of the light modulating component (2) comprises planar facets.

7. A device according to claim 1, wherein the motion is rotational and the relative axis of rotation of the light modulator (2) is offset from both the first and second light transmission axes of the light source (8).

8. A device according to claim 1, wherein a second light modulating component (4) is provided for modulating the light either before or after it passes through the first light modulating component (2).

9. A device according to claim 8, wherein the second light modulating component (4) comprises a diffraction grating, a textured glass or a textured acrylic.

10. A device according to claim 8, wherein the second optical modulating component (4) is removable.

11. A device according to claim 1, wherein a light receiving surface (5) is provided.

12. A device according to claim 11, wherein the light receiving surface (5) forms part of an outer housing of the device.

13. A device according to claim 12, wherein the outer housing of the device is at least partially translucent.

* * * * *